June 3, 1969     M. GALASSO ET AL     3,447,712

CENTRIFUGE TEST TUBE CAP

Filed Dec. 13, 1965

MAURICE GALASSO
JOSEPH C. KIRBY
INVENTORS

BY Louis Mok

ATTORNEY

MAURICE GALASSO
JOSEPH C. KIRBY
INVENTORS

United States Patent Office 3,447,712
Patented June 3, 1969

3,447,712
CENTRIFUGE TEST TUBE CAP
Maurice Galasso, Los Gatos, and Joseph C. Kirby, San Jose, Calif., assignors to Beckman Instruments, Inc., a corporation of California
Filed Dec. 13, 1965, Ser. No. 513,280
Int. Cl. B65d 39/12
U.S. Cl. 220—24.5                      4 Claims

ABSTRACT OF THE DISCLOSURE

A vessel cap in which a washer with a lower beveled surface is interposed between a crown and a stem. An O-ring is disposed between the stem and the beveled surface of the washer so that when the crown and the stem are clamped together the O-ring deforms, entirely filling the space between the stem and beveled surface forming a liquid tight seal.

---

This invention relates generally to centrifuges in which the material to be centrifuged is placed in test tubes carried by the centrifuge rotor. More particularly, the present invention relates to the caps which are used to seal the tops of the test tubes.

Figure 5:
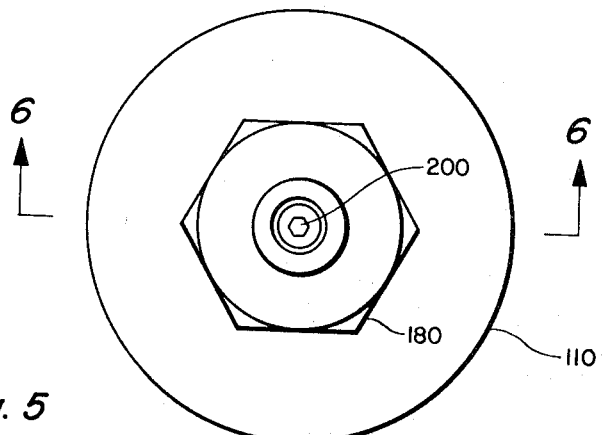

Analytical and preparative centrifuges are commonly provided with a rotor having a series of cavities, usually arranged in circular fashion, adapted to receive test tubes for carrying the sample to be centrifuged. In the typical analytical or preparative centrifuge rotor, the axis of each cavity is angularly oriented with respect to the vertical rotational axis of the rotor so that the bottom of the test tube is further from the rotor axis than the top. An example of an angle head rotor is shown in FIG. 5 of U.S. Patent No. 2,878,992 to Pickels et al. issued on Mar. 24, 1959. Inclined-tube rotors are advantageous in that initially, precipitate is collected at the bottom of the tube at a more rapid rate than with a tube having its longitudinal axis parallel to the rotor axis.

During rotor operation, the sample is caused to climb up the centrifugal (outermost) side of the test tube. Eventually, when a sufficiently high rotational velocity is reached, the surface of the sample stands virtually parallel with the rotor axis. To prevent leakage of the sample, each test tube is provided with a cap sealing off the mouth. It will be evident that if the test tube used in an angle rotor is initially full or almost full leakage of the sample from the top of the test tube will occur unless the cap provides an adequate seal.

Test tube caps of the prior art often leak when they are subjected to centrifugal forces of 275,000 g.'s and above, as may be produced at rotor speeds exceeding 60,000 r.p.m. Leakage appears to be caused by distortion or "cold flow" of the resilient gasket element in the centrifugal force field.

A further disadvantage of certain prior art tube caps is that when the cap is clamped over the test tube it is difficult to determine the torque level at which a satisfactory seal is produced. In addition, the prior art cap of the type employing a flat washer between the stem and the crown is easily misaligned when applied to the tube. Furthermore, the flat washer is usable only only or twice because of permanent set resulting from extrusion of the washer into the tube when the cap is tightened and from cold flow during centrifugation.

Accordingly, it is an overall object of the present invention to provide an improved, leakproof test tube cap which may be utilized with a substantially full test tube carried by centrifuge rotor spun at high speeds and subjected to high centrifugal forces.

According to one specific, exemplary form or embodiment of the present invention shown and described herein, there is provided a test tube cap comprising generally a stem dimensioned for a snug fit inside the mouth of the test tube and provided with an upper, horizontal surface, a seal washer having a lower, outwardly sloping surface, a resilient gasket disposed between the sloping surface of the washer and the upper surface of the stem, a crown which fits snugly over the mouth of the test tube and means for clamping together the stem and the crown. The crown has an inwardly-facing surface dimensioned for a snug fit with the outside surface of the test tube. With the cap in place on the test tube, tightening of the clamping means causes the gasket to be compressed between the sloping surface of the washer and the upper surface of the stem and simultaneously wedged against the inside wall surface of the test tube. As a result of this action, the outside surface of the test tube is pressed against the inwardly-facing surface of the crown. When the cap is tightened, the gasket fills substantially the entire space between the stem and the washer thereby eliminating cold flow and providing a definite torque indication that a seal has been effected. The elimination of cold flow not only prevents leakage but also permits the gasket to be reused many times.

Figure 1:
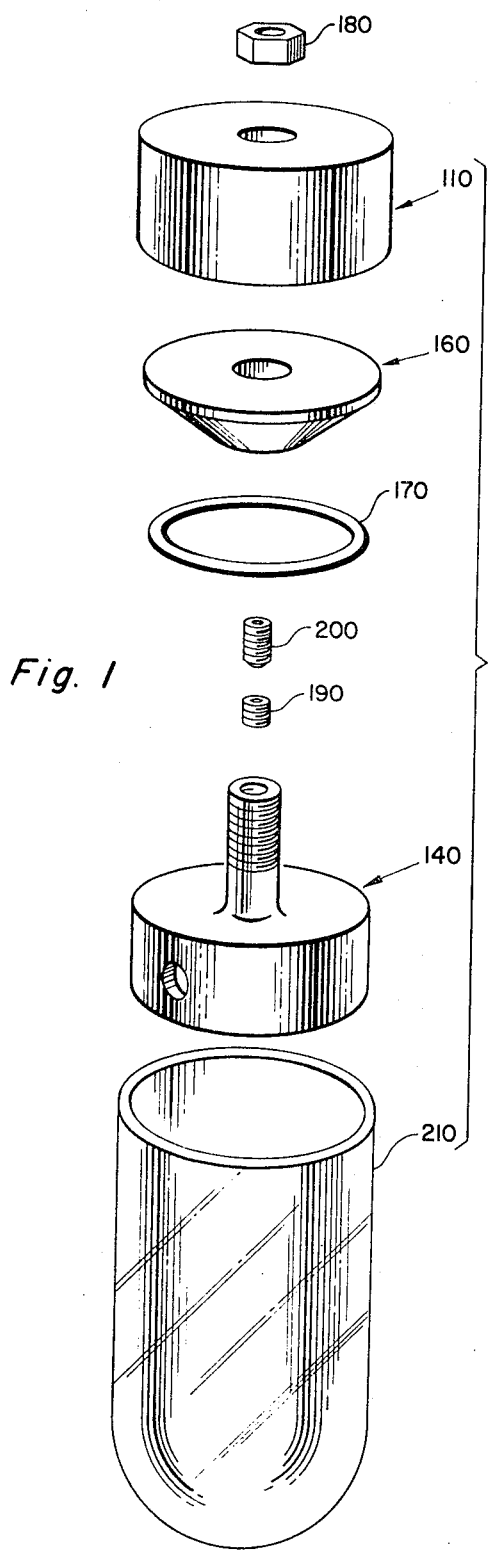
Figure 2:
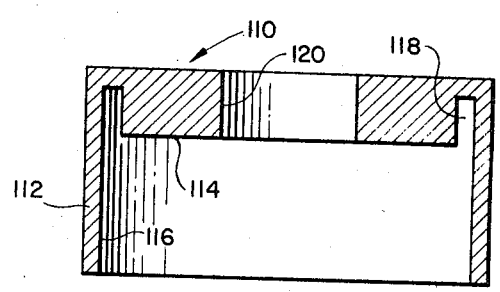
Figure 3:
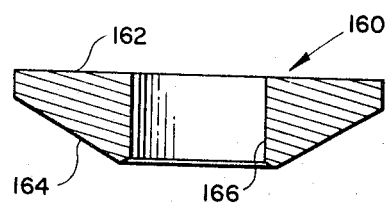
Figure 4:
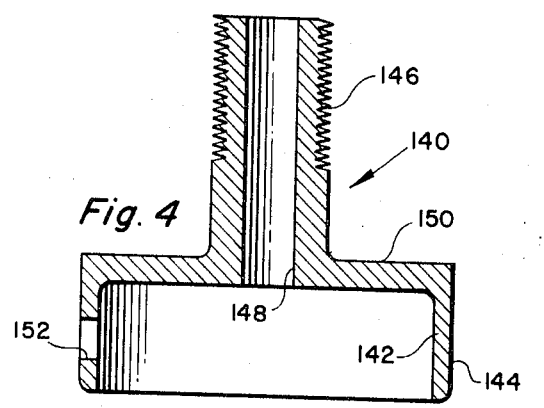

The novel features which are believed to be characteristic of the invention are set forth with particularity in the appended claims. The invention itself, however, together with further objects and advantages thereof can best be understood by reference to the following description taken in connection with the accompanying drawings in which:

FIG. 1 is a perspective, exploded view of a test tube cap in accordance with the present invention;
FIG. 2 is a sectional side view of the crown element;
FIG. 3 is a sectional side view of the seal washer;
FIG. 4 is a sectional side view of the stem element;
FIG. 5 is a top view of the test tube cap of FIG. 1 as assembled; and
FIG. 6 is a side view, in section, of the cap assembly of FIG. 5 taken along the plane 6—6.

Turning now to the drawings, there is shown in FIG. 1 a centrifuge test tube cap comprising generally a crown 110, a stem 140, a seal washer 160, a resilient gasket 170, a nut 180, an insert 190 and a set screw 200. The cap is adapted to fit over the mouth of a test tube 210 which may be made, for example, of a polyallomer or cellulose plastic or stainless steel.

The crown 110, the details of which are best shown in FIG. 2, has a generally cylindrical shape and is provided with a depending skirt 112 and a depending boss 114 positioned interiorly of, and concentrically with, the skirt 112. The skirt 112 has an inwardly-facing surface 116 dimensioned for a snug fit with the outside wall surface of the test tube. The depending skirt 112 and the depending boss 114 define between then an annular groove 118 for receiving the mouth of the test tube as shown in FIG. 6. A centrally located clearance hole 120 is further provided in the crown 110.

Figure 6:
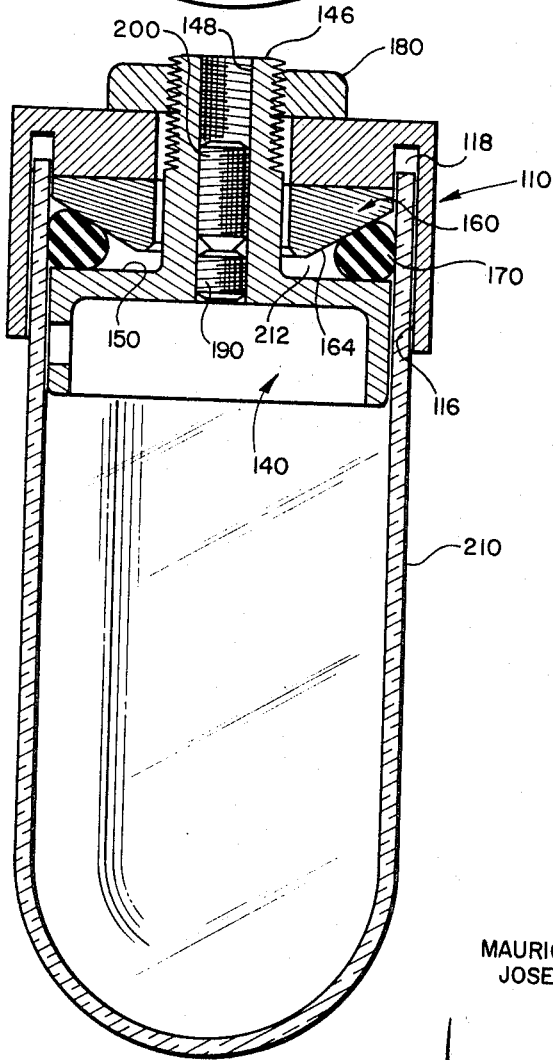

The stem 140, shown in detail in FIG. 4, has a downwardly extending cylindrical wall 142 with an outside surface 144 dimensioned to fit snugly inside the mouth of the test tube as shown in FIG. 6. An axial threaded stud 146, having a centrally located, threaded hole 148, projects upwardly from an upper, horizontal surface 150. A hole 152 in the wall 142 aids in breaking the seal which may exist between the stem 140 and the test tube when the cap is removed.

FIG. 3 illustrates the seal washer 160 which is adapted to be interposed between the crown 110 and the stem 140. The seal washer 160 is generally cylindrical, having an outside diameter approximately equal to that of the boss 114. The washer 160 has an upper surface 162 which engages the depending boss 114 of the crown when the cap is assembled. A lower, outwardly sloping surface 164 is further provided which faces the upper surface 150 of the crown 140 when the elements are assembled. A clearance hole 166, similar to hole 120 in the crown 110, is provided in the seal washer 160 for receiving the upwardly extending stud 146 on the stem 140.

FIGS. 5 and 6 show the assembled cap in place over the mouth of the centrifuge test tube 210. The seal washer 160 and the resilient gasket 170, which may be in the form of a synthetic rubber O-ring, are sandwiched between the crown 110 and the stem 140. The stud 146 projects through the clearance holes in the seal washer and the crown and receives the nut 180. The upper edge of the test tube 210 is received by the annular groove 118 in the crown. It will be noted that a generally triangular chamber 212 is formed by the horizontal surface 150 of the stem, the outwardly sloping surface 164 of the seal washer and the inside wall surface of the test tube 210. The O-ring 170 is confined within this chamber. As the nut 180 is tightened, the O-ring 170 is compressed and deformed, the sloping surface 164 wedging the O-ring outwardly against the inner wall surface of the test tube. This action in turn biases the outer wall surface of the test tube against the surface 116 of the skirt 112. Continued tightening of the nut 180 causes the O-ring 170 to substantially fill the triangular chamber 212. This substantially precludes the O-ring from cold flowing in the direction of the higher centrifugal force. In addition, when the O-ring is compressed and deformed to a point where it substantially fills the triangular chamber, an appreciable increase in the tightening torque is noted and this serves as a positive indication that the seal has been effected. Over-tightening of the nut 180, which might result in damage to the O-ring, is thereby avoided and the O-ring may therefore be re-used many times before it needs to be discarded. Furthermore, it should be noted that in its uncompressed form, the outside diameter of the O-ring 170 is slightly less than the inside diameter of the test tube 210. As a result, when the assembled cap is placed over the mouth of the test tube prior to tightening the nut 180, substantially no resistance or drag is encountered between the O-ring and the test tube. This virtually precludes misalignment between the cap and the test tube which might otherwise result in damage to the test tube when the nut is tightened.

The threaded center hole 148 in the crown 140 permits the removal of the tube contents with an instrument such as a hypodermic syringe. During centrifugation, the hole 148 is closed off by means of a threaded insert 190. A set screw 200 may be used to lock the insert 190 in place.

It will be obvious to those skilled in the art that various modifications may be made to the specific, exemplary embodiment of the invention described. For example, the crown 110 and the seal 160 may be combined and constructed as a single element.

What is claimed is:
1. A centrifuge cap for a vessel comprising
a stem having an outer surface dimensioned for a snug fit with the inside wall surface of said vessel and an upper, horizontal surface;
a seal washer, having an upper surface and a lower, outwardly sloping surface;
a resilient gasket disposed between said upper horizontal surface of said stem and said lower, outwardly sloping surface of said seal washer;
a crown having a depending skirt including an inwardly facing surface dimensioned for a snug fit with the outside wall surface of said vessel and a depending boss for engaging said upper surface of said seal washer, said skirt and said boss defining an annular groove for receiving the mouth of said vessel; and
means for clamping together said stem and said crown whereby said gasket is compressed and wedged against said inside wall surface of said vessel, said outside wall surface of said vessel being biased against said inwardly facing surface of said depending skirt.
2. A vessel cap, as defined in claim 1, in which
said means for clamping together said stem and said crown comprises
a stud extending upwardly from said upper, horizontal surface of said stem through said seal washer and through a hole in said crown; and
a nut threaded on the outer end of said stud.
3. A vessel cap, as defined in claim 2, in which
said resilient gasket comprises an O-ring which, when uncompressed, has an outside diameter slightly less than the inside diameter of said vessel.
4. A centrifuge cap for a vessel comprising
a stem having an outer surface dimensioned for a snug fit with the inside wall surface of said vessel and an upper horizontal surface;
a crown having a depending skirt including an inwardly facing surface dimensioned for a snug fit with the outside wall surface of said vessel and a depending boss which together with said skirt defines an annular groove for receiving the mouth of said vessel, said boss having a lower outwardly sloping surface;
a resilient gasket disposed between said upper horizontal surface of said stem and said lower, outwardly sloping surface of said boss; and
means for clamping together said stem and said crown whereby said gasket is compressed and wedged against said inside wall surface of said vessel, said outside wall surface of said vessel being biased against said inwardly facing surface of said depending skirt.

References Cited

UNITED STATES PATENTS

| | | | |
|---|---|---|---|
| 1,903,168 | 3/1933 | Cordrey | 220—24.5 |
| 2,064,569 | 12/1936 | Santucci | 220—24.5 |
| 2,763,293 | 9/1956 | Kruck | 220—24.5 X |
| 2,952,526 | 9/1960 | Carlson et al. | 220—24.5 X |
| 3,071,316 | 1/1963 | Piemonte et al. | 220—24.5 X |

DONALD F. NORTON, Primary Examiner.

U.S. Cl. X.R.

215—54